United States Patent
Kim et al.

(10) Patent No.: US 7,206,892 B2
(45) Date of Patent: Apr. 17, 2007

(54) METHOD FOR MANAGING RECORDED STREAMS IN A REWRITABLE RECORDING MEDIUM

(75) Inventors: Mi Hyun Kim, Seoul (KR); Sung Ryun Cho, Seoul (KR); Byung Jin Kim, Kyunggi-do (KR); Kang Soo Seo, Anyang (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 10/446,852

(22) Filed: May 29, 2003

(65) Prior Publication Data

US 2003/0229642 A1   Dec. 11, 2003

(30) Foreign Application Priority Data

Jun. 5, 2002   (KR) ............. 10-2002-0031749

(51) Int. Cl.
*G06F 12/14* (2006.01)
(52) U.S. Cl. ............... 711/100; 711/156; 725/29; 725/94; 725/134; 386/94
(58) Field of Classification Search ........ 711/100, 711/156; 725/29, 94, 134; 386/94
See application file for complete search history.

(56) References Cited

U.S. PATENT DOCUMENTS

| | | | |
|---|---|---|---|
| 2001/0052019 A1* | 12/2001 | Walters et al. | 709/231 |
| 2002/0013940 A1* | 1/2002 | Tsukamoto et al. | 725/5 |
| 2003/0028652 A1* | 2/2003 | Bardini et al. | 709/229 |
| 2003/0040962 A1* | 2/2003 | Lewis | 705/14 |
| 2004/0126098 A1* | 7/2004 | Kim et al. | 386/117 |
| 2004/0236778 A1* | 11/2004 | Junqua et al. | 707/100 |
| 2004/0240848 A1* | 12/2004 | Seo et al. | 386/95 |
| 2005/0005308 A1* | 1/2005 | Logan et al. | 725/135 |
| 2005/0060756 A1* | 3/2005 | Daniels | 725/134 |
| 2005/0086696 A1* | 4/2005 | Daniels | 725/88 |
| 2005/0198677 A1* | 9/2005 | Lewis | 725/87 |

FOREIGN PATENT DOCUMENTS

| | | | |
|---|---|---|---|
| JP | 02001297205 A | * | 10/2001 |
| JP | 2002-077799 A | | 3/2002 |
| KR | 1998-0004781 A | | 3/1998 |
| KR | 2001-0052131 A | | 6/2001 |
| KR | 1020010055509 A | | 7/2001 |
| KR | 1020010094497 A | | 11/2001 |

* cited by examiner

*Primary Examiner*—Matthew Kim
*Assistant Examiner*—Hetul Patel
(74) *Attorney, Agent, or Firm*—Birch, Stewart, Kolasch & Birch, LLP

(57) ABSTRACT

The present invention relates to a method for managing playlists of a rewritable recording medium in order to prevent unlimited playback or illegal edition of television broadcast programs or movies wherein copyright protection is required. The present invention operates by adding information needed for automatic timed deletion of consecutively recorded clips of A/V streams and deletion time information into the playlists of a recording medium such as a high density rewritable optical disc (BD-RW), whereby referring to the recorded information, the corresponding clips of A/V streams are automatically deleted.

13 Claims, 4 Drawing Sheets

*Deleted by user*

FIG. 5 xxxxx.rpls-syntax

| xxxxx.rpls{ |
|---|
| version_number |
| PlayLists_start_address |
| PlayListMark_start_address |
| MakersPrivateData_start_address |
| reserved_for_furture_use |
| UIAppInfoPlayList() |
| for(i=0; i<N1; i++){ |
|   padding_word |
| } |
| PlayList() |
| for(i=0; i<N2; i++){ |
|   padding_word |
| } |
| : |
| } |

| UIApplinfoPlayList(){ |
|---|
| length |
| reserved_for_furture_use |
| PlayList_character_set |
| reserved_for_word_align |
| time_bomb_flag |
| if time_bomb_flag =1    { expire_time_info } |
| playback_protect_flag |
| write_protect_flag |
| is_played_flag |
| : |
| } |

METHOD FOR MANAGING RECORDED STREAMS IN A REWRITABLE RECORDING MEDIUM

BACKGROUND OF THE INVENTION

1. Field of the Invention

The present invention relates to a method for automatic timed deletion of video and audio streams stored in a recording medium such as a rewritable optical disc.

2. Description of the Related Art

Recently, in accordance with rapid advancement of standardization of a novel high density rewritable recording medium such as 'Blu-ray Disc Rewritable'(hereinafter referred to as BD-RW) where high quality video and audio data can be recorded for many hours, it is expected that related products will soon be developed and released to consumer market.

FIG. 1 illustrates a partial structure of an optical disc apparatus such as a video disc recorder (VDR) which records signals in a recording medium such as BD-RW or plays signals thereof. The optical disc apparatus may comprise an optical pickup 2 to read out recorded signals from the recording medium such as BD-RW 1 or to record processed data streams from external inputs; a VDR system 3 to process signals read out from the optical pickup 2 for playback or to transform external data streams into those suitable for recording; and an encoder 4 to encode analog signals from external sources to output to the VDR system 3.

As illustrated in FIG. 2, clips of A/V streams recorded in the BD-RW 1, for example, a first clip of A/V stream (Clip 1 A/V Stream) and a second clip of A/V stream (Clip 2 A/V Stream), each of which is recorded consecutively are managed by a first real playlist (Real PlayList 1) and a second real playlist (Real PlayList 2) generated automatically at the time of recording respective A/V streams, wherein respective play control information to read out and play are contained.

In addition, a playlist enabling access to sections selectively chosen from a part or whole of the A/V stream clips recorded in said manner can be generated, which is termed as a virtual playlist. Referring to FIG. 2, within the virtual playlist, a playitem of main path (PlayItem) to read out and play the first clip of A/V stream associated with the first real playlist and a sub playitem of a subpath (Sub PlayItem) to read out and play the second clip of A/V stream associated with the second real playlist can be recorded and managed.

Accordingly, while performing a series of play operations of reading out and playing the first clip of A/V stream managed by the first real playlist, the optical disc apparatus of VDR system 3 can select and play the second clip of A/V stream managed by the second real playlist upon user request.

On the other hand, the VDR system 3, in response to user request, may delete or edit a part of the first clip of A/V stream or second clip of A/V stream. As depicted in FIG. 3, in case a part of the second clip of A/V stream is deleted, the remaining part of the partially deleted A/V stream is broken up into an A/V stream of second clip and an A/V stream of third clip with corresponding second real playlist and third real playlist generated and further managed, wherein play control information to read out and play the A/V streams are incorporated.

In order to allow a user to randomly select, edit and play real playlists managed by said procedure, a virtual playlist is generated and recorded, wherein the playitem of the main path to read out and play the A/V stream of first clip associated with the first real playlist and sub playitem of the sub path to read out and play the A/V stream of third clip associated with the third real playlist can be recorded and managed at the same time. Consequently, in response to user request, the VDR system 3 of the optical disc apparatus, while performing a series of play operations of reading out and playing the A/V stream of the first clip associated with the first real playlist, can select and play the A/V stream of the third clip associated with the third real playlist.

Because the optical disc apparatus as described, in response to user request, allows random editing of recorded clips of A/V streams and playing clips of the A/V streams, however, user's unlimited playback or illegal editing of proprietary television programs or movies are made possible, where copyright protection and payment are essential. Presently, however, an effective means to prohibit such behavior is yet to be prepared.

SUMMARY OF THE INVENTION

By taking said aspect into account, an embodiment of the present invention is directed to a providing means for automatic timed deletion of clips of A/V streams in order to protect copyright and to secure payment for proprietary television programs and movies which are recorded in a recording medium such as a high density optical disc (BD-RW). The embodiment provides a method for managing recorded streams in a rewritable recording medium, thereby user's unlimited playback or illegal editing of digital contents recorded in a recording medium can be prohibited, where copyright protection is required.

A method of managing recorded streams in a rewritable recording medium to achieve the objective in accordance with an embodiment of the present invention is characterized in that it comprises the following steps: recording a clip of data stream with time continuity in a rewritable recording medium; and recording additional management information in a playlist in order for automatic deletion of the clip of data stream after predetermined time.

Another method for managing recorded streams in a rewritable recording medium according to an embodiment of the present invention is characterized in that it comprises the following steps: searching for and checking an automatic deletion flag and deletion time information included in a playlist corresponding to a clip of data stream recorded with time continuity in a rewritable recording medium; and determining to conduct an automatic deletion of the clip of data stream with reference to the automatic deletion flag and deletion time information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the Drawings:

FIG. 5 is a diagram illustrating a syntax of a real playlist with an automatic deletion flag recorded by a method for managing recorded streams according to an embodiment of the present invention.

DETAILED DESCRIPTION OF THE PREFERRED EMBODIMENTS

Hereinafter, a preferred embodiment of the present invention for managing recorded streams in a rewritable recording medium will be described in detail with reference to appended drawings.

Figure 1:
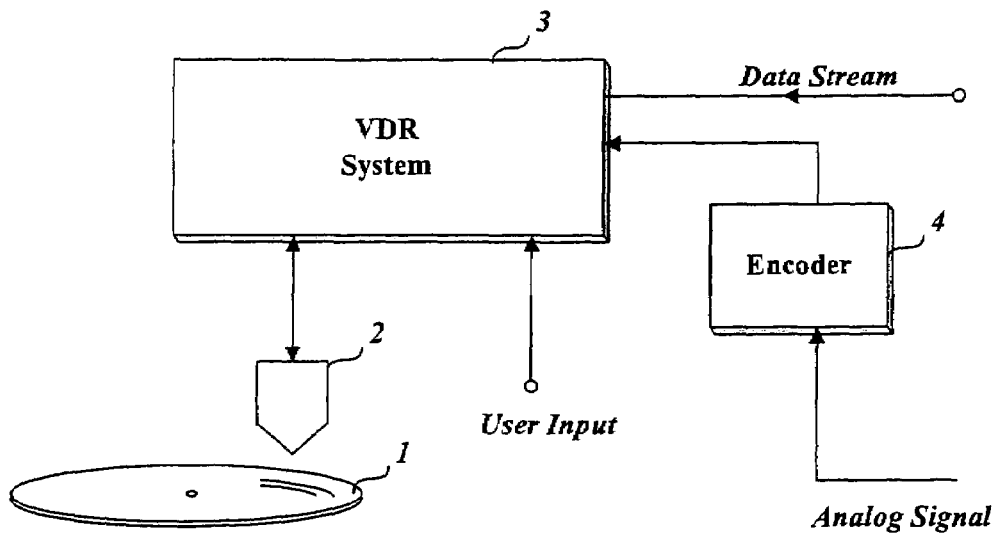
FIG. 1 is a diagram illustrating a partial structure of an optical disk apparatus such as a video disk recorder (VDR)
Figure 2:
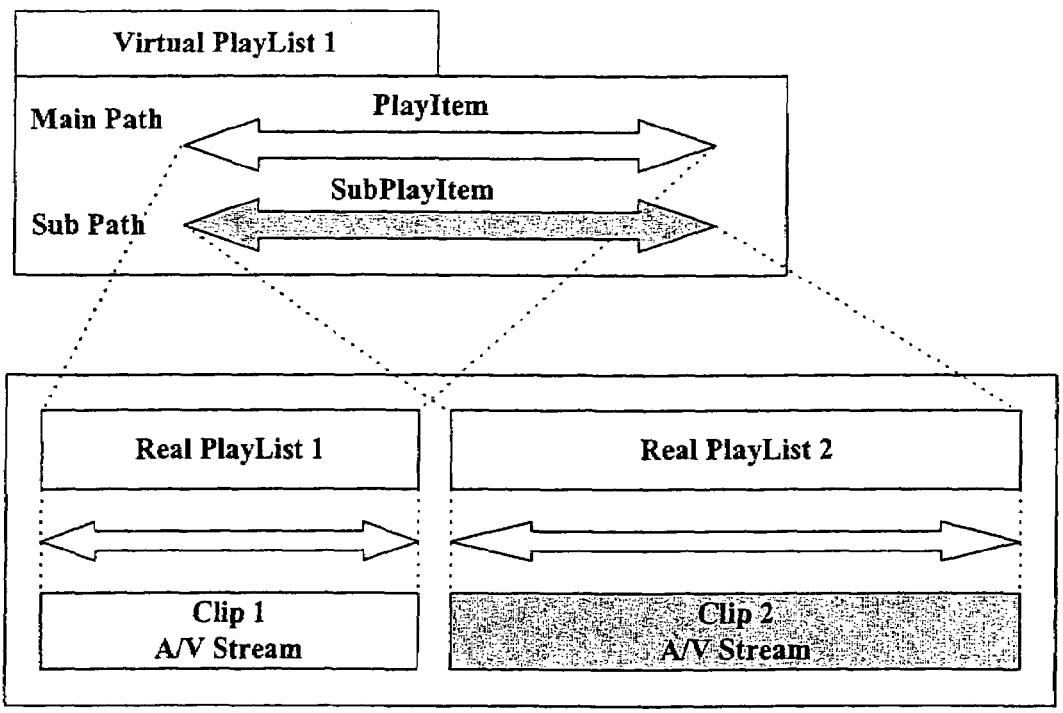
FIG. 2 and FIG. 3 are diagrams depicting a situation wherein clips of A/V streams recorded in a rewritable optical disc, including associated real playlists and a virtual playlist.
Figure 3:
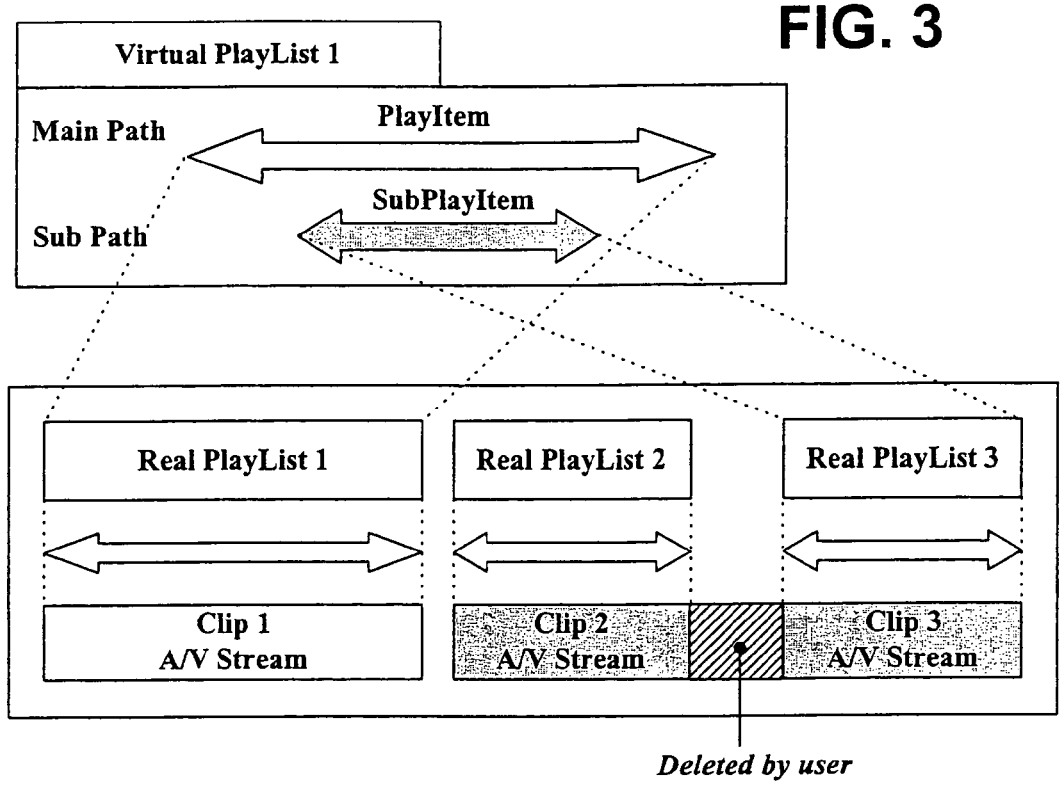
Figure 4:
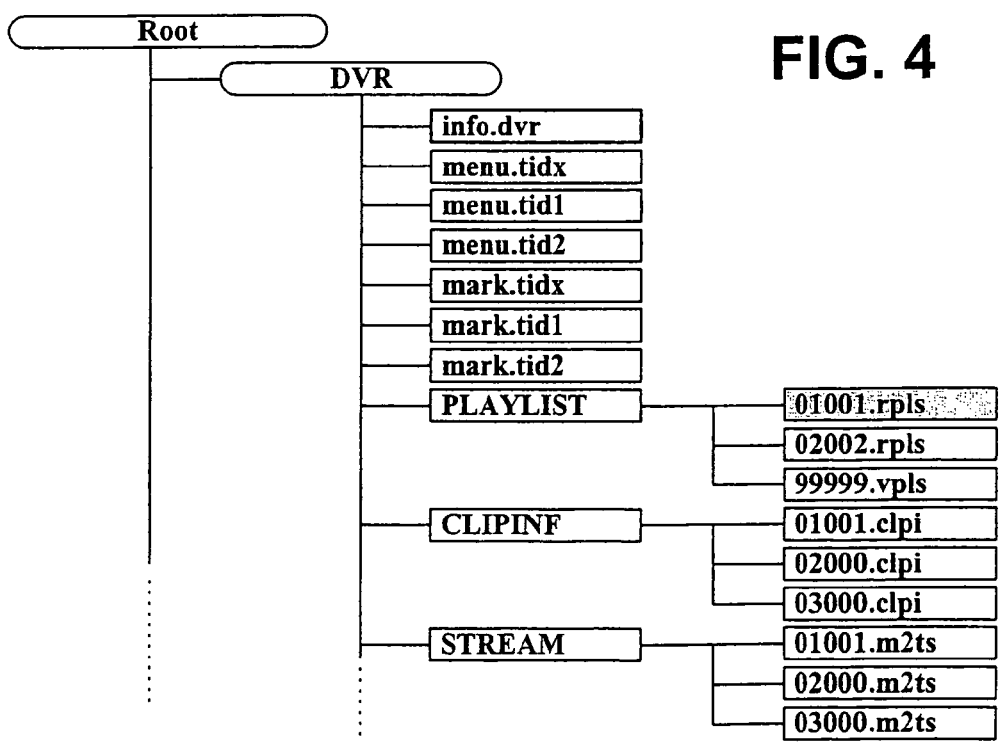
FIG. 4 is a diagram illustrating the file structure of a rewritable optical disc.

FIG. 4 is a diagram showing the file structure of a rewritable optical disc, such as a BD-RW. As shown in FIG. 4, the BD-RW may employ a file structure, which may include a root directory at the top of the file structure; at least one DVR directory beneath the root directory; an 'info.dvr' file, 'menu.tidx' files, and 'mark.tidx' files under each DVR directory; a PLAYLIST subdirectory where multiple real and virtual playlist files (*.rpls, *.vpls) are placed; a CLIP-INF subdirectory where multiple clip information files (*.clpi) are placed; and a STREAM subdirectory where multiple record data stream files (*.m2ts) corresponding to respective clip information files are placed.

On the other hand, record data stream files recorded in the STREAM subdirectory, more specifically, various play control information for '01001.m2ts' and '02002.m2ts' files are recorded in '01001.clpi' and '02002.clpi' files respectively, which are placed in the CLIPINF subdirectory; playlist information which determines serial playing of the '01001.m2ts' and '02002.m2ts' files and order of playing can be recorded in '01001.rpls' file placed in the PLAYLIST subdirectory.

As depicted in FIG. 5, within the playlist files (*.rpls, *.vpls), more specifically, in the syntax of a real As depicted in FIG. 5, within the playlist files (*.rpls, *.vpls), more specifically, in the syntax of a real playlist file (xxxx.rpls), recorded are a version number; start addresses of playlist, playlist mark, and maker private data; and playlist of user interface application information (UIAppInforPlayList) wherein a one bit automatic deletion flag (time_bomb_flag) and corresponding deletion time information (expire_time_info) in accordance with an embodiment of the present invention are included. In case the automatic deletion flag is set in order to prohibit the user's arbitrary unlimited playback or editing of a clip of A/V stream where copyright protection and security for payment are needed, deletion time information is added to automatically delete the corresponding clip of A/V stream. For this purpose, one bit allocated from four bits of reserved area for word alignment by predetermined record size or from another reserved area can be used as the automatic deletion flag.

The deletion time information can be added as an absolute time information irrespective of start time of playing or relative time information counted from the start of playing, which automatic deletion flag and information of deletion time can be included in a received A/V stream. If not included in the received A/V stream, a disc recorder can set up the deletion time and activate the automatic deletion flag. In this case, deletion time may be predetermined, for example, 'after 96 hours'.

After recording in this manner, by searching and identifying the deletion time information which is stored together with the automatic deletion flag, the optical disc apparatus of VDR system (3) may automatically delete the corresponding clip of A/V stream, thereby preventing user's unlimited playback or arbitrary editing thereof, where the automatic deletion flag is set to. This procedure is further described in the following.

Figure 6:
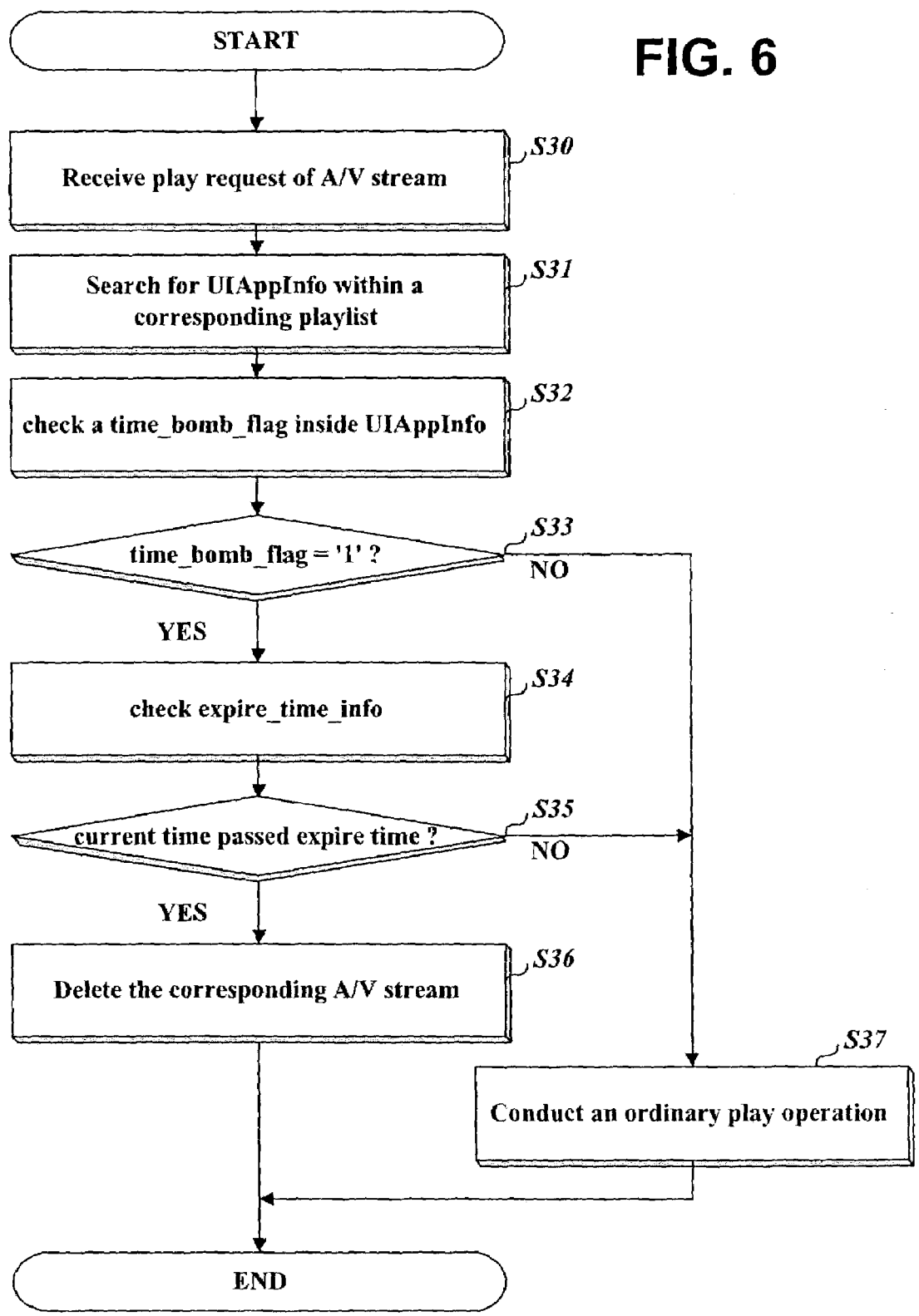
FIG. 6 is a diagram illustrating an operational flowchart of a method for managing recorded streams in a rewritable recording medium according to an embodiment of the present invention.

FIG. 6 illustrates the operational flow of the method for managing the record data streams in a rewritable recording medium according to an embodiment of the present invention. As shown in FIG. 6, when the user sends a play request for a clip of A/V stream (S30) among the clips of an A/V streams stored in the BD-RW 1, the VDR system 3 may search for the playlist corresponding to the clip of A/V stream, after which it may identify a user interface application information playlist (UIAppInfoPlayList) included therein (S31).

The VDR system 3 may then search for and check the automatic deletion flag (time_bomb_flag) included in the user interface applications information playlist (S32); in case when. If the automatic deletion flag is set to, it may search for and check the deletion time information (expire_time_infor) linked with the automatic deletion flag (S34).

Thereafter, with reference to the checked deletion time information, if the absolute time information, which is independent of start time of playing, coincides with or precedes the present time (S35), the clip of A/V system is considered to be a proprietary television program or movie with copyright protection or payment required, by and the A/V stream may be deleted (S36). On the contrary, when If the automatic deletion flag (time_bomb_flag) is not set or the deletion time information (expire_time_info) is set after present time, the VDR system 3 may perform an ordinary play operation upon user request (S37).

On the other hand, if the deletion time information (expire_time_info) is recorded as a relative time information counted from the start of the initial play of the clip of the A/V stream, elapsed time from the initial play of the clip of A/V stream may be counted and compared with deletion time information. Subsequently, when the elapsed time counted from the initial play coincides with or exceeds the deletion time information, the A/V stream may be deleted, whereas if the elapsed time counted from the initial play is less than the deletion time information, the ordinary play operation upon user request may be performed.

Moreover, by adding an edition protection flag (edit_protect_flag) to prevent partial deletion or unauthorized editing of the corresponding clip of the A/V stream to the user interface application information playlist (UIAppInfo PlayList), and thereafter enabling the edition protection flag and the automatic deletion flag and deletion time information to be related each other, copyright protection and secured payment for proprietary television programs or movies can be made effective.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

What is claimed is:

1. A method for managing digital data, comprising the steps of:

recording the digital data onto a recording medium, the digital data including a digital content; and recording management information onto the recording medium to automatically delete the digital content after a predetermined time, wherein the management information includes indication information indicating whether or not the digital content is to be deleted after the predetermined time, and wherein the management information is recorded into a playlist referring to the digital content.

2. The method according to claim 1, wherein the management information further includes time information indicating when the digital content is to be deleted, and wherein the time information is valid only when the indication information indicates that the digital content is to be deleted.

3. The method according to claim 2, wherein the time information is one of an absolute time of deletion or a relative time of deletion counted from an initial access.

4. The method according to claim 3, wherein the initial access to the digital content is a first playback of the digital content.

5. The method according to claim 1, wherein the management information is additionally recorded into a field of user interface application information playlist of the playlist.

6. The method according to claim 1, wherein the playlist is included in a logical volume conforming to a Blu-ray disc format.

7. A method for managing digital data, comprising the steps of:
(a) checking management information associated with a timed deletion of the digital data, wherein the digital data includes a digital content recorded in a recording medium and wherein the management information includes indication information indicating whether or not the digital content is to be deleted after a predetermined time; and (b) determining whether or not to delete the digital content after the predetermined time based on a result of checking the management information, wherein the management information is recorded in a playlist, wherein the playlist refers to the digital content.

8. The method according to claim 7, wherein the management information includes time information indicating when to delete the digital content, wherein the time information is valid only when the indication information indicates that the digital content is to be deleted.

9. The method according to claim 8, wherein the step (a) includes checking the time information only when the indication information indicates a presence of the time information.

10. The method according to claim 8, wherein the time information includes an absolute time and wherein the step (b) includes deleting the digital content if a present time is past the absolute time specified in the time information.

11. The method according to claim 8, wherein the time information includes a relative time amount and wherein the step (b) includes deleting the digital content if an elapsed time from an initial access of the digital content has passed the relative time amount specified in the time information.

12. The method according to claim 11, wherein the initial access to the digital content is a first playback of the digital content.

13. The method according to claim 7, wherein the playlist is included in a logical volume conforming to a Blu-ray disc format.

* * * * *